(12) United States Patent
Yamasaki

(10) Patent No.: US 11,604,953 B2
(45) Date of Patent: Mar. 14, 2023

(54) PRINTING DEVICE, CONTROL METHOD OF PRINTING DEVICE, STORAGE MEDIUM STORING CONTROL PROGRAM, AND PRINTING CONTROL DEVICE

(71) Applicant: CASIO COMPUTER CO., LTD., Tokyo (JP)

(72) Inventor: Shuichi Yamasaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 36 days.

(21) Appl. No.: 17/179,297

(22) Filed: Feb. 18, 2021

(65) Prior Publication Data

US 2021/0271940 A1    Sep. 2, 2021

(30) Foreign Application Priority Data

Feb. 28, 2020    (JP) .............................. JP2020-033735

(51) Int. Cl.
*B41J 29/393*    (2006.01)
*G06K 15/02*    (2006.01)
*G06T 7/00*    (2017.01)

(52) U.S. Cl.
CPC .......... *G06K 15/027* (2013.01); *B41J 29/393* (2013.01); *G06T 7/001* (2013.01); *B41J 2029/3935* (2013.01); *B41J 2029/3937* (2013.01); *G06T 2207/30144* (2013.01)

(58) Field of Classification Search
CPC ........ B41J 29/393; B41J 3/407; B41J 3/4071; B41J 3/4073; B41J 3/40731; B41J 3/40733; B41M 5/0088
See application file for complete search history.

(56) References Cited

U.S. PATENT DOCUMENTS

2017/0367459 A1*  12/2017  Yamasaki ............. A45D 34/04

FOREIGN PATENT DOCUMENTS

| CN | 1388743 A | 1/2003 |
| CN | 106942877 A | 7/2017 |
| JP | 2003-534083 A | 11/2003 |
| JP | 2017018589 A * | 1/2017 ............. A45D 29/00 |
| JP | 2017-121305 A | 7/2017 |
| JP | 2017-164394 A | 9/2017 |
| WO | 01/91598 A1 | 12/2001 |

OTHER PUBLICATIONS

JPO; Application No. 2020-033735; Notice of Reasons for Refusal dated Apr. 26, 2022.
CNIPA; Application No. 202110212252.0; Office Action dated Apr. 24, 2022.

* cited by examiner

*Primary Examiner* — Julian D Huffman
(74) *Attorney, Agent, or Firm* — Fitch, Even, Tabin & Flannery LLP

(57) ABSTRACT

Disclosed is a printing device including: a print head; a camera that photographs a printing target which is printed by the print head; and at least one processor that determines whether or not printing is properly performed to the printing target based on a printed image which is photographed by the camera, and that changes a printing setting by the print head in response to determination that the printing is not properly performed to the printing target.

16 Claims, 11 Drawing Sheets

| | FINGER NO. | LEFT HEIGHT LEVEL | RIGHT HEIGHT LEVEL | INCLINATION LEVEL |
|---|---|---|---|---|
| RIGHT THUMB | 1 | 2 | 2 | 3 |
| RIGHT INDEX FINGER | 2 | 2 | 2 | 0 |
| RIGHT MIDDLE FINGER | 3 | 2 | 2 | 0 |
| RIGHT RING FINGER | 4 | 2 | 2 | 0 |
| RIGHT LITTLE FINGER | 5 | 2 | 2 | 0 |
| LEFT THUMB | 6 | 2 | 2 | 3 |
| LEFT INDEX FINGER | 7 | 2 | 2 | 0 |
| LEFT MIDDLE FINGER | 8 | 2 | 2 | 0 |
| LEFT RING FINGER | 9 | 2 | 2 | 0 |
| LEFT LITTLE FINGER | 10 | 2 | 2 | 0 |

| | FINGER NO. | LEFT CURVE LEVEL | RIGHT CURVE LEVEL | INCLINATION LEVEL |
|---|---|---|---|---|
| RIGHT THUMB | 1 | 2 | 2 | 3 |
| RIGHT INDEX FINGER | 2 | 2 | 2 | 0 |
| RIGHT MIDDLE FINGER | 3 | 2 | 2 | 0 |
| RIGHT RING FINGER | 4 | 2 | 2 | 0 |
| RIGHT LITTLE FINGER | 5 | 2 | 2 | 0 |
| LEFT THUMB | 6 | 2 | 2 | 3 |
| LEFT INDEX FINGER | 7 | 2 | 2 | 0 |
| LEFT MIDDLE FINGER | 8 | 2 | 2 | 0 |
| LEFT RING FINGER | 9 | 2 | 2 | 0 |
| LEFT LITTLE FINGER | 10 | 2 | 2 | 0 |

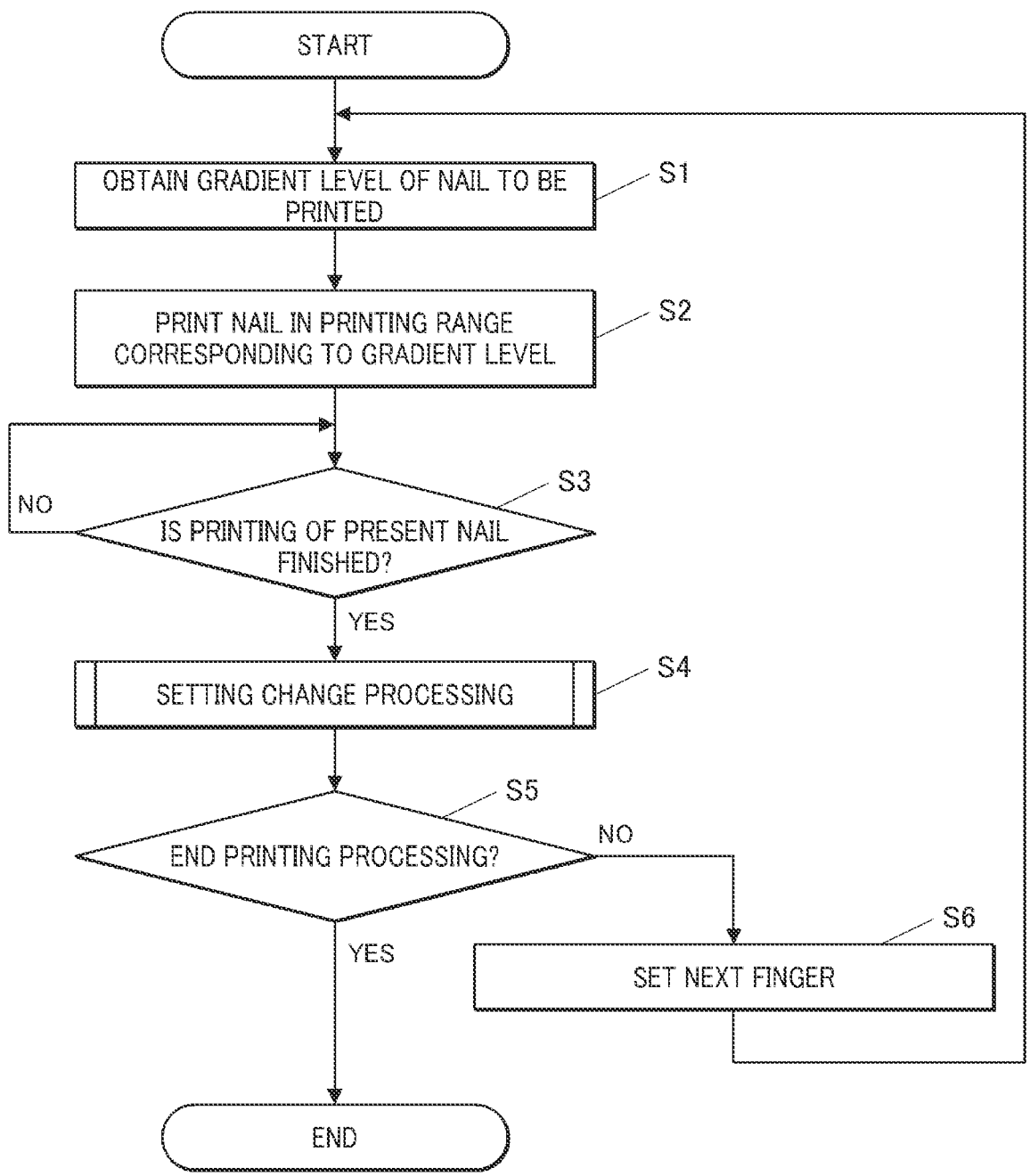

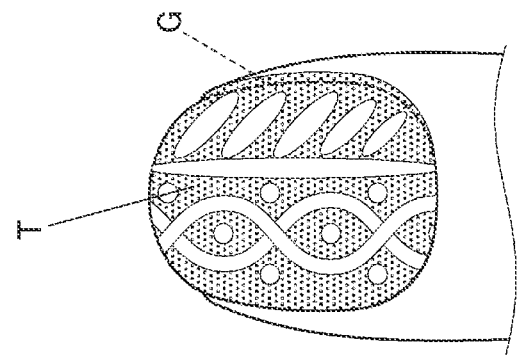
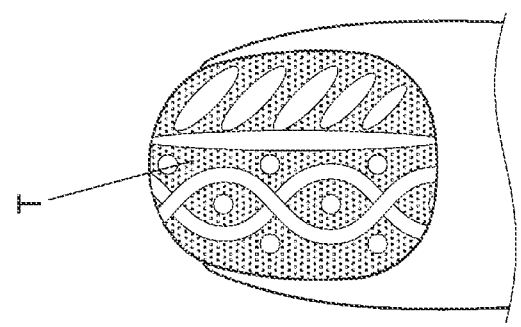
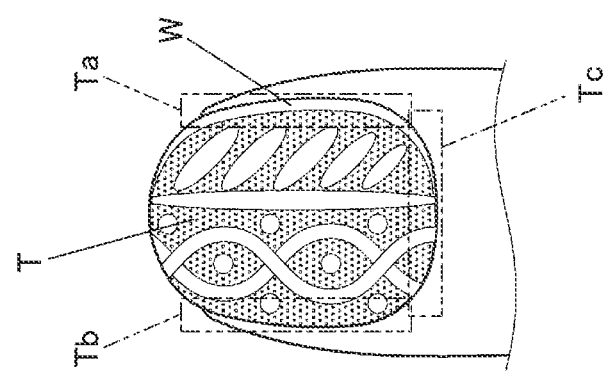
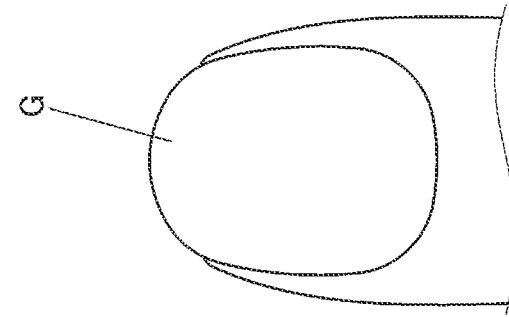

FIG. 9

| | FINGER NO. | LEFT HEIGHT LEVEL | RIGHT HEIGHT LEVEL | INCLINATION LEVEL | LEFT DETERMINATION FLAG | RIGHT DETERMINATION FLAG | INCLINATION DETERMINATION FLAG |
|---|---|---|---|---|---|---|---|
| RIGHT THUMB | 1 | 2 | 2 | 3 | 0 | 0 | 0 |
| RIGHT INDEX FINGER | 2 | 2 | 2 | 0 | 0 | 0 | 0 |
| RIGHT MIDDLE FINGER | 3 | 2 | 2 | 0 | 0 | 0 | 0 |
| RIGHT RING FINGER | 4 | 2 | 2 | 0 | 0 | 0 | 0 |
| RIGHT LITTLE FINGER | 5 | 2 | 2 | 0 | 0 | 0 | 0 |
| LEFT THUMB | 6 | 2 | 2 | 3 | 0 | 0 | 0 |
| LEFT INDEX FINGER | 7 | 2 | 2 | 0 | 0 | 0 | 0 |
| LEFT MIDDLE FINGER | 8 | 2 | 2 | 0 | 0 | 0 | 0 |
| LEFT RING FINGER | 9 | 2 | 2 | 0 | 0 | 0 | 0 |
| LEFT LITTLE FINGER | 10 | 2 | 2 | 0 | 0 | 0 | 0 |

| | FINGER NO. | LEFT HEIGHT LEVEL | RIGHT HEIGHT LEVEL | INCLINATION LEVEL | LEFT DETERMINATION FLAG | RIGHT DETERMINATION FLAG | INCLINATION DETERMINATION FLAG | FIRST-TIME FLAG |
|---|---|---|---|---|---|---|---|---|
| RIGHT THUMB | 1 | 2 | 2 | 3 | 0 | 0 | 0 | 1 |
| RIGHT INDEX FINGER | 2 | 2 | 2 | 0 | 0 | 0 | 0 | 1 |
| RIGHT MIDDLE FINGER | 3 | 2 | 2 | 0 | 0 | 0 | 0 | 1 |
| RIGHT RING FINGER | 4 | 2 | 2 | 0 | 0 | 0 | 0 | 1 |
| RIGHT LITTLE FINGER | 5 | 2 | 2 | 0 | 0 | 0 | 0 | 1 |
| LEFT THUMB | 6 | 2 | 2 | 3 | 0 | 0 | 0 | 1 |
| LEFT INDEX FINGER | 7 | 2 | 2 | 0 | 0 | 0 | 0 | 1 |
| LEFT MIDDLE FINGER | 8 | 2 | 2 | 0 | 0 | 0 | 0 | 1 |
| LEFT RING FINGER | 9 | 2 | 2 | 0 | 0 | 0 | 0 | 1 |
| LEFT LITTLE FINGER | 10 | 2 | 2 | 0 | 0 | 0 | 0 | 1 |

823B

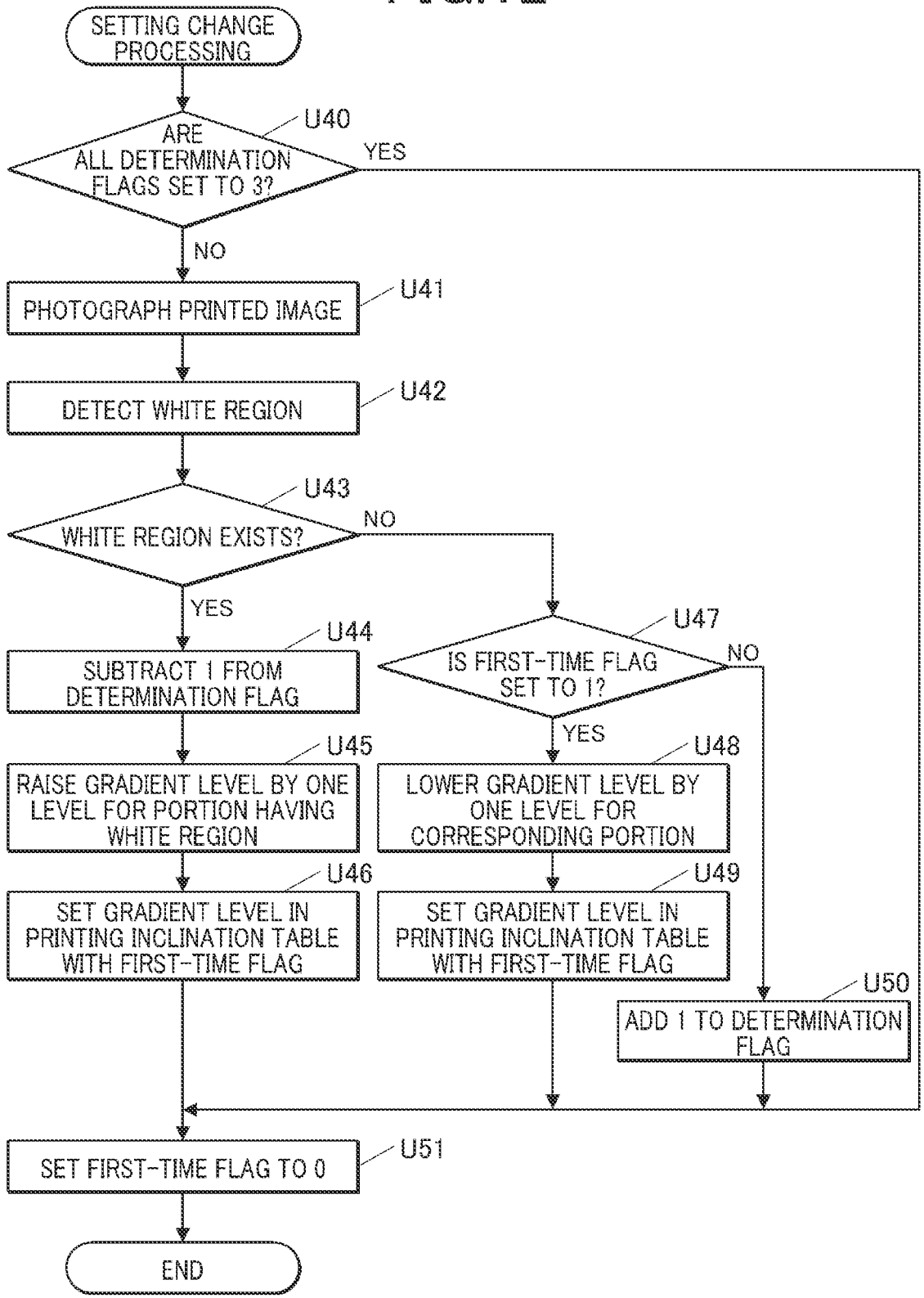

PRINTING DEVICE, CONTROL METHOD OF PRINTING DEVICE, STORAGE MEDIUM STORING CONTROL PROGRAM, AND PRINTING CONTROL DEVICE

CROSS-REFERENCE TO RELATED APPLICATION

This application is based upon and claims the benefit of priority from the prior Japanese Patent Application No. 2020-033735, filed on Feb. 28, 2020, the entire contents of which are incorporated herein by reference.

BACKGROUND OF THE INVENTION

1. Field of the Invention

The present disclosure relates to a printing device, a control method of the printing device, a storage medium storing a control program, and a printing control device.

2. Description of the Related Art

Conventionally, there are known printing devices that print nail designs on fingernails, thumbnails and toenails of people and the like (for example, see JP 2003-534083 A). Such printing devices enable users to draw nail designs without using nail salons or the like.

Such printing devices detect shapes (contours) of nails by using optical sensors such as cameras, and print nail designs according to the detected regions.

When printing is performed with a printing device, it is preferable to have a constant distance between a print head and a nail surface that is a printing target. Thus, it is necessary to perform adjustment such that the nail surface is arranged at a position proper for the printing.

However, when printing is performed onto a gel nail which is already applied to the nail surface, a fake nail which is attached to the nail surface, or the like, the printing target surface is higher than the actual nail surface in some cases.

When the position of the printing target surface is higher than the actual nail height, setting the nail at the same position as the position of a nail of a normal height causes the possibility that the print head will contact the printing target surface.

SUMMARY OF THE INVENTION

In order to solve the above problems, a printing device according to the present disclosure includes: a print head; a camera that photographs a printing target which is printed by the print head; and at least one processor that determines whether or not printing is properly performed to the printing target based on a printed image which is photographed by the camera, and that changes a printing setting by the print head in response to determination that the printing is not properly performed to the printing target.

BRIEF DESCRIPTION OF THE DRAWINGS

The accompanying drawings are not intended as a definition of the limits of the invention but illustrate embodiments of the disclosure, and together with the general description given above and the detailed description of the embodiments given below, serve to explain the principles of the disclosure, wherein:

FIGS. 3A and 3B are views each of which shows an example of a printing inclination setting table in the embodiment;

FIG. 6 is a flowchart showing the flow of printing processing of the nail printing device in the embodiment;

FIGS. 8A to 8D are views showing an example of applying a ground paint and printed image examples of a nail;

FIG. 9 is a view showing an example of a printing inclination setting table in a first modification example of the embodiment;

FIG. 11 is a view showing an example of a printing inclination setting table in a second modification example of the embodiment; and FIG. 12 is a flowchart showing the flow of printing processing of a nail printing device in the second modification example of the embodiment.

DETAILED DESCRIPTION OF THE PREFERRED EMBODIMENTS

An embodiment of a printing device according to the present disclosure will be described.

The embodiment described below is provided with various limitations technically preferable for carrying out the present disclosure. However, the scope of the present disclosure is not limited to the embodiment below or illustrated examples.

Further, in the following embodiment, a case where the printing device is a nail printing device that performs printing on a fingernail or a thumbnail of a hand as a printing target will be described as an example. However, the printing target of the printing device in the present disclosure is not limited to the fingernail or the thumbnail of the hand. For example, the toenail of a foot may be the printing target. The printing target may also be targets other than nails, such as nail tips and surfaces of various accessories.

Figure 1:
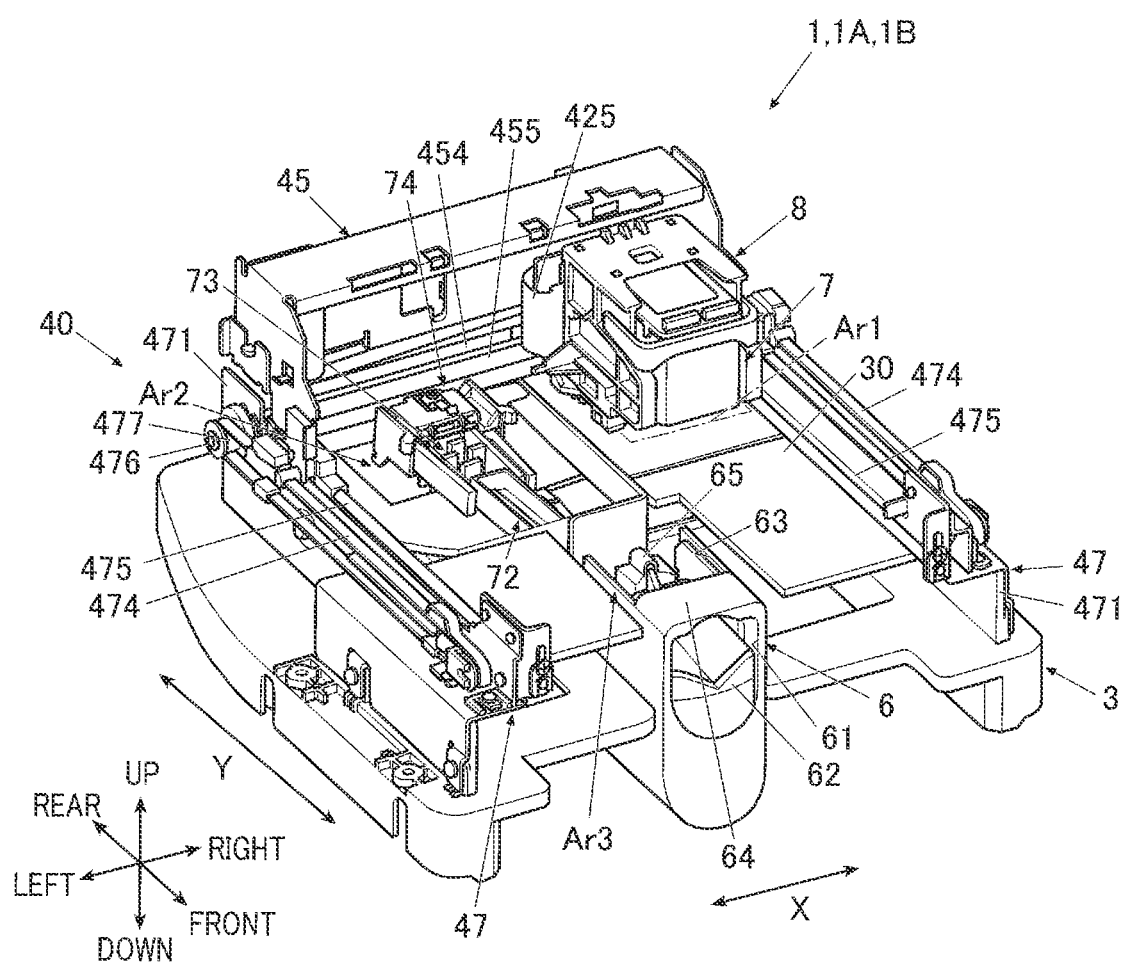
FIG. 1 is a main part perspective view showing the internal configuration of a nail printing device in an embodiment.

FIG. 1 is a main part perspective view showing the internal configuration of a nail printing device 1.

In the following embodiment, the up, down, left and right, and front and rear refer to the directions shown in FIG. 1. Further, the X direction and the Y direction respectively refer to the left-right direction and the front-rear direction.

As shown in FIG. 1, the nail printing device 1 includes a base 3 in which various internal structures are incorporated.

On the upper side of the base 3, there is arranged a base upper plate 30 which is substantially flat. The base upper plate 30 is arranged at a height that is substantially flush with the surface of the nail (printing target surface) in a state in which the printing finger is fixed to an after-mentioned finger fixing unit 6. The base upper plate 30 divides at least the portions on the left and rights sides of the finger fixing unit 6 into the upper region and the lower region with respect to the height where the base upper plate 30 is arranged.

The finger fixing unit 6 is arranged in a portion on a front side of the base upper plate 30 and substantially in a center in the left-right direction. The finger fixing unit 6 is a box-like member having an opening 61 that opens to the front side of the nail printing device 1. The finger of the printing target (printing finger) is inserted into the nail printing device 1 from the opening 61, and printing is performed to this nail.

A finger fixing member 62 that fixes the printing finger is arranged inside the finger fixing unit 6. The finger fixing member 62 pushes up and supports the printing finger from below, and is formed of, for example, a flexible resin.

The back portion (rear portion) of the top surface of the finger fixing unit 6 is open and forms a window 63. From the window 63, the nail of the finger inserted into the finger fixing unit 6 is exposed.

With the front portion of the top surface, the finger fixing unit 6 forms a finger presser 64 which prevents the printing finger from floating (rising) and regulates the position of the printing finger in the upward direction. The printing finger is supported by the finger fixing member 62 from the lower side, and the upper side of the printing finger is pressed by the finger presser 64, so that the position in the height direction of the surface of the nail of the printing finger (printing target surface) is determined at a predetermined position proper for printing by the printing unit 40.

On the back side (rear side in the Y direction) of the base upper plate 30 with respect to the finger fixing unit 6, a home position Ar1 that is a waiting area for a cartridge 7 (cartridge holder 8) to be described later during non-printing time, and a maintenance area Ar2 for performing maintenance such as cleaning of the cartridge 7 during the non-printing time are provided.

In the present embodiment, the home position Ar1 is arranged on the right side in the width direction (X direction) in the nail printing device 1, and the maintenance area Ar2 is arranged on the left side.

A printing unit 40 that prints on the printing target surface is provided in the nail printing device 1. The printing target surface in the embodiment is the surface of the printing target. In the present embodiment, the printing target surface is the surface of a fingernail or a thumbnail.

The printing unit 40 includes: the cartridge 7 that functions as a print head; the cartridge holder 8 that supports the cartridge 7; an X-direction moving stage 45 and an X-direction moving motor 46 (see FIG. 2) for moving the cartridge 7 in the X direction along the left-right direction; and Y-direction moving stages 47 and a Y-direction moving motor 48 (see FIG. 2) for moving the cartridge 7 in the Y direction along the front-rear direction.

The Y-direction moving stages 47 have support members 471 provided on both sides of the base upper plate 30 in the left-right direction so as to extend in the front-rear direction (Y direction).

To both ends in the extending direction of each of the support members 471 which form a pair, pulleys 477 are attached. Around the pulleys 477 on the left and right sides of the nail printing device 1, respective drive belts 474 extending in the front-rear direction are wound.

The pulleys 477 provided on the rear side of the nail printing device 1 are attached to both ends of a drive shaft portion 476. The Y-direction moving motor 48 (see FIG. 2) is connected to the drive shaft portion 476. By the Y-direction moving motor 48 being driven, the drive shaft portion 476 and the pulleys 477 attached thereto are properly rotated in forward and reverse directions as needed.

The rotation of pulleys 477 rotates the drive belts 474 wound around the pulleys 477, so that the X-direction moving stage 45 (and the cartridge 7 mounted on the X-direction moving stage 45) can move in the Y direction.

On the support members 471, guide shafts 475 extending in the front-rear direction are arranged parallel to the drive belts 474.

The X-direction moving stage 45 is formed in a rectangular box shape extending in the left-right direction (X direction), and is provided at the rear end portion of the base upper plate 30.

Into the right and left ends of the X-direction moving stage 45, the guide shafts 475 are inserted, respectively. When the Y-direction moving motor 48 (see FIG. 2) is driven, the drive belts 474 rotate, so that the X-direction moving stage 45 can move in the Y direction along the guide shafts 475.

Pulleys (not shown in the drawings) are provided inside the X-direction moving stage 45, and a drive belt 454 extending in the left-right direction is wound around the pulleys. In the X-direction moving stage 45, a guide shaft 455 extending in the left-right direction is arranged substantially parallel to the drive belt 454.

The cartridge holder 8 that attachably and detachably holds the cartridge 7 is mounted on the X-direction moving stage 45.

On the back side of the cartridge holder 8 (rear side in FIG. 1), a holder support member (not shown in the drawings) through which the guide shaft 455 is inserted is provided.

The cartridge holder 8 is movable in the X direction along the guide shaft 455 in the X-direction moving stage 45 by the X-direction moving motor 46 (see FIG. 2) driving and the drive belt 454 rotating.

In the present embodiment, the X-direction moving motor 46, the Y-direction moving motor 48 and the like form a head moving mechanism 49 (see FIG. 2) that can move the cartridge 7 as a print head in the X direction and the Y direction. The operation of the head moving mechanism 49 is controlled by an after-mentioned control device 80 (especially printing controller 813).

It is not necessary to provide, on a single control substrate, the entire printing controller 813 that controls the operation of cartridge 7 and the operation of head moving mechanism 49. For example, a control substrate (not shown in the drawings) on which a controller 81 controlling the ink ejection of cartridge 7 and the operation of X-direction moving motor 46 is mounted and which is electrically connected to the main control substrate may be provided to the X-direction moving stage 45. In the present embodiment, a flexible print wiring substrate 425 is provided to the rear side of the cartridge holder 8. This print wiring substrate 425 is electrically connected to the control substrate provided in the X-direction moving stage 45. The control signal from the printing controller 813 provided on the main control substrate is transmitted to the print wiring substrate 425 via the control substrate provided in the X-direction moving stage 45, to perform ink ejection control of the cartridge 7 according to the control by the printing controller 813.

The cartridge 7 in the present embodiment functions as a print head as mentioned above, and an inkjet type inkjet head that performs printing by spraying micro droplets of ink onto the surface to be printed of the printing target (nail)

from the ink ejection section on its lower surface. The cartridge 7 can eject ink of yellow (Y), magenta (M), and cyan (C), for example.

The cartridge 7 is configured to move in the region on the upper side of the substrate upper plate 30.

The finger fixing unit 6 is arranged in a portion on a front side of the base upper plate 30 and substantially in a center in the left-right direction as mentioned above. In the present embodiment, the region corresponding to the window 63 of this finger fixing unit 6 is a printing area Ar3 where the cartridge 7 performs the printing operation during the printing time.

The above-mentioned home position Ar1 is on the right side of the rear portion of the base upper plate 30. A cap section (not shown in the drawings) that covers the ink ejection surface on the lower surface of the cartridge 7 is provided in the home position Ar1. The cap section protects the ink ejection surface from drying or the like during the non-printing time, and is formed of a flexible resin, for example.

The above-mentioned maintenance area Ar2 is on the left side of the rear portion of the base upper plate 30. In the maintenance area Ar2, a purging section 72 that performs purge (spit) processing, and a wiping section 73 that wipes the ink ejection surface are provided.

In the what is called purge processing, ink is forcibly ejected from the ink ejection port of the ink ejection surface of cartridge 7 and the air, impurities, ink with an increased viscosity and the like in the ink flow path in a nozzle are discharged outside together with ink. In the purge processing, the purging section 72 receives the ink which is forcibly ejected from the ink ejection surface. By performing the purge processing, clogging and the like generated in the nozzle of the cartridge 7 are resolved, and the cartridge 7 can return to a good ejection state.

The wiping section 73 is a maintenance section that performs cleaning by wiping the ink ejection surface on the lower surface of cartridge 7. The wiping section 73 has a plurality of standing wiping members. In the present embodiment, a scraping section 74 that removes the ink attached to the wiping members is provided in the rear side of the wiping section 73.

Figure 2:
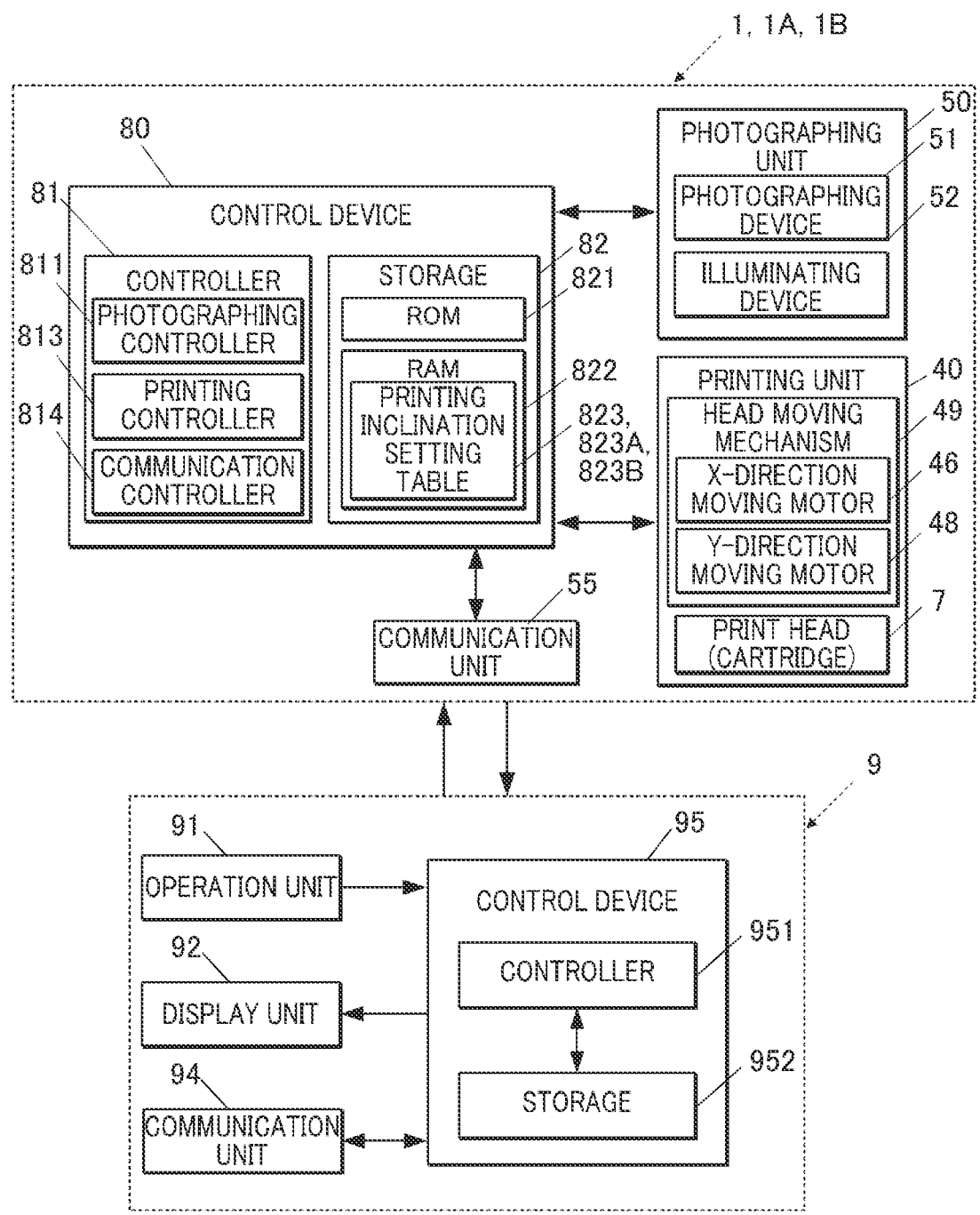
FIG. 2 is a control block diagram showing a schematic control configuration of the nail printing device in the embodiment.

FIG. 2 is a control block diagram showing the schematic control configuration of the nail printing device 1.

As shown in FIG. 2, the nail printing device 1 includes a photographing unit 50, a communication unit 55, and a control device 80 in addition to the printing unit 40 described above.

The photographing unit 50 (camera) includes a photographing device 51 and an illuminating device 52.

The photographing unit 50 is arranged above the window 63 of the finger fixing unit 6. The photographing unit 50 performs photographing of the printing finger arranged in the finger fixing unit 6 with the photographing device 51 while illuminating the nail of the printing finger with the illuminating device 52. Then, the photographing unit 50 obtains a nail image (an image of the finger including the nail image) that is an image of the nail of the printing finger.

The photographing unit 50 may be configured to be movable in the X and Y directions by the head moving mechanism 49 that moves the cartridge 7.

The photographing device 51 is, for example, a small-sized camera configured by including a CCD (Charge Coupled Device) type or CMOS (Complementary Metal Oxide Semiconductor) type solid imaging element which has approximately two million pixels or more and a lens. The illuminating device 52 is an illuminating lamp, such as a white LED.

The communication unit 55 is configured to be able to transmit and receive information to and from an aftermentioned terminal device 9 that operates in cooperation with the nail printing device 1.

The communication between the nail printing device 1 and the terminal device 9 is performed by, for example, a wireless LAN. The communication between the nail printing device 1 and the terminal device 9 is not limited to this, and any method may be used. For example, a network line such as the Internet may be used, or wireless communication based on a near field communication standard such as Bluetooth (registered trademark) or Wi-Fi may be performed. Further, this communication is not limited to wireless communication, and various types of data may be transmitted and received between the nail printing device 1 and the terminal device 9 by wired connection. The communication unit 55 includes an antenna chip or the like corresponding to the communication method of the terminal device 9.

The control device 80 is a computer that includes: a controller 81 configured by including a CPU (Central Processing Unit) (not shown in the drawings); and a storage 82 configured by including a ROM (Read Only Memory) 821, a RAM (Random Access Memory) 822, and the like.

The storage 82 stores various programs and various types of data for operating the nail printing device 1.

Specifically, the ROM 821 of the storage 82 stores various programs such as a maintenance program for performing the maintenance operation of doing maintenance on the cartridge 7 and a printing program for performing printing processing. These programs are executed by the control device 80. Thereby, each part of the nail printing device 1 is controlled in an integrated manner.

The RAM 822 of the storage 82 stores a printing inclination setting table 823.

The printing inclination setting table 823 is shape data including information on the gradient degree on front, rear, left and right sides of each fingernail and the thumbnail. As shown in FIG. 3A, the gradient level representing the gradient degree of the nail includes left and right height levels and an inclination level in each of left and right fingers.

Figure 4A:
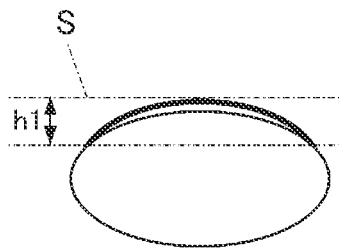
FIGS. 4A to 4C are views for explaining nail height levels.
Figure 4B:
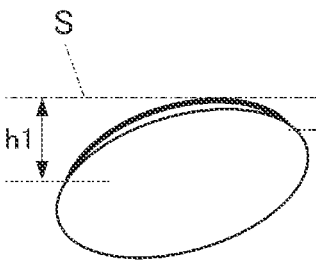
Figure 4C:
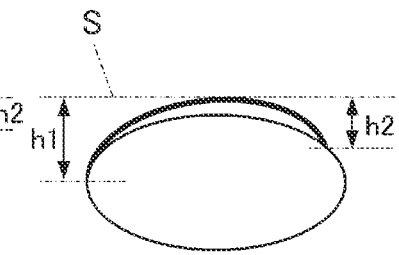

As shown in FIGS. 4A to 4C, the height h1 is a length from a reference position S to the right end of the nail and the height h2 is a length from the reference position S to the left end of the nail. The left and right height levels are obtained by dividing each of the height h1 and the height h2 into a plurality of levels and expressing the level by a numerical value. The reference position S is the highest position in the nail region in a state in which the finger is fixed with the central portion of tip of the nail placed on the nail placement table 65 of the finger fixing unit 6 (see FIGS. 1 and 5A and 5B). The left and right heights h1 and h2 vary among individuals from standard heights h1 and h2 which are nearly equal to each other (FIG. 4A) to heights h1 and h2 which are largely different (FIGS. 4B and 4C) due to the inclination on the left and right sides or the like when the finger is fixed, according to the nail shape and the shape of the pad of the finger.

Figure 5A:
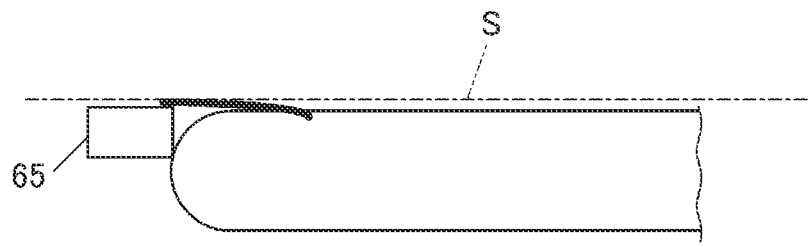
FIGS. 5A and 5B are views for explaining nail inclination levels.
Figure 5B:
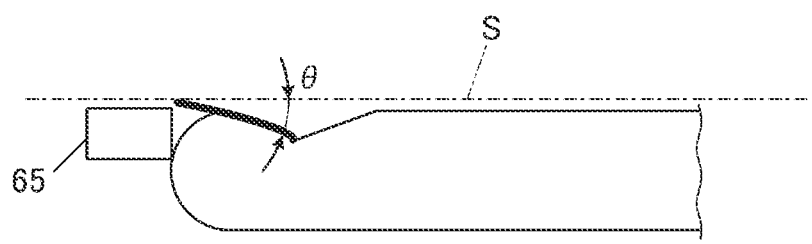

As shown in FIGS. 5A and 5B, the inclination level is obtained by dividing the inclination θ in the front-rear direction (longitudinal direction of finger) of the nail into a plurality of levels and expressing the level with a numerical value. The inclination θ varies among individuals from nearly zero (FIG. 5A) to a depressed nail base (FIG. 5B).

The printing inclination setting table 823 is set and managed for each user who performs printing as mentioned later. Thus, each printing inclination setting table 823 is stored so as to be associated with the user ID (user identifying information) except for the printing inclination setting table 823 setting each numerical value of default (standard setting). The numerical value of default represents the nail shape of each standard finger, and the storage 82 may store in advance at least this default printing inclination setting table 823.

As shown in FIG. 3B, the printing inclination setting table 823 may include left and right curve levels instead of (or in addition to) left and right height levels. The left and right curve levels are obtained by dividing the curve degree in each of the right end and left end of the nail into a plurality of levels and expressing the level with a numerical value. This curve level corresponds to the height level, and includes height information of the nail and represents the gradient degree of the nail similarly to the height level.

Though not particularly limited, in the present embodiment, each of the height level, inclination level, and curve level is divided into six levels from 0 to 5 (level 0 indicates smallest height/inclination/curve, and level 5 indicates the largest height/inclination/curve).

As shown in FIG. 2, the controller 81 includes functional sections such as a photographing controller 811, a printing controller 813, and a communication controller 814. The functions of these respective functional sections are realized by the cooperation of the CPU of the controller 81 and the program stored in the ROM 821 of the storage 82.

The photographing controller 811 controls the photographing device 51 and the illuminating device 52 of the photographing unit 50, and causes the photographing device 51 to photograph a finger image (nail image) including an image of a nail of a printing finger fixed to the finger fixing unit 6.

The image data of the nail image acquired by the photographing unit 50 is transmitted to the terminal device 9 via the communication unit 55. The image data may be stored in the storage 82.

The printing controller 813 is a controller that outputs a control signal to the printing unit 40 based on the data for printing transmitted from the terminal device 9, and controls the X-direction moving motor 46 and the Y-direction moving motor 48, cartridge 7, and the like of the printing unit 40 so as to perform printing on the nail according to the data for printing.

The communication controller 814 controls the operation of the communication unit 55. In the present embodiment, the communication controller 814 controls communication with the terminal device 9, and controls to receive data for printing or the like when the data is transmitted from the terminal device 9.

When the nail image is acquired by the photographing unit 50, the communication controller 814 controls to transmit the nail image data to the terminal device 9 together with temporal information such as date and time when the nail image was acquired.

When an abnormality occurs in the operation state, for example, a trouble or the like occurs in the nail printing device 1 during printing, the communication controller 814 may transmit the information indicating that the abnormality occurs to the terminal device 9.

The nail printing device 1 in the present embodiment is configured to be able to communicate with the terminal device 9, and executes the printing operation and the like on the basis of the operation instruction from the terminal device 9.

The terminal device 9 is, for example, a mobile terminal such as a smartphone or a tablet. However, the terminal device 9 is not particularly limited as long as the terminal device 9 can communicate with the nail printing device 1. For example, the terminal device 9 may be a notebook or a stationary personal computer, a terminal device for a game, or the like.

Specifically, the terminal device 9 includes an operation unit 91, a display unit 92, a communication unit 94, a control device 95, and the like.

The operation unit 91 can perform various inputs and settings according to user operations. When the operation unit 91 is operated, an input signal corresponding to the operation is transmitted to the control device 95. In the present embodiment, a touch panel is integrally provided on the surface of the display unit 92, and the user can perform various input/setting operations by touch operations on the touch panel.

The operation unit 91 for performing various input/setting operations is not limited to the touch panel. For example, various operation buttons, a keyboard, a pointing device, and the like may be provided as the operation unit 91.

In the present embodiment, the user can select a nail design to be printed on the nail by operating the operation unit 91.

The touch panel configured in the display unit 92 displays various display screens under the control of a controller 951 to be described later.

In the present embodiment, the display unit 92 can display a nail design which was input or selected by the user from the operation unit 91, an image which was transmitted from the nail printing device 1, and the like.

The communication unit 94 can transmit data for printing to the nail printing device 1. Further, when data such as a nail image is transmitted from the nail printing device 1, the communication unit 94 receives the transmitted data. The communication unit 94 includes a wireless communication module that can communicate with the communication unit 55 of the nail printing device 1.

It is sufficient that the communication unit 94 can communicate with the nail printing device 1, and a communication unit that matches the communication standard of the communication unit 55 of the nail printing device 1 is applied as the communication unit 94.

The control device 95 is a computer that includes: a controller 951 configured by including a CPU (Central Processing Unit) not shown in the drawings; and a storage 952 configured by including a ROM (Read Only Memory) and a RAM (Random Access Memory) not shown in the drawings.

The storage 952 stores various data and various programs for operating each part of the terminal device 9.

Specifically, the ROM or the like of the present embodiment stores various programs such as a nail print application program for performing nail printing using the nail printing device 1 in addition to an operation program for controlling each part of the terminal device 9 in an integrated manner. The control device 95 expands and executes these programs in a working area of the RAM, for example, so that the terminal device 9 is controlled.

The storage 952 of the present embodiment stores nail design data, information on the nail image and nail shape, and the like.

The controller 951 controls the operation of each part of the terminal device 9 in an integrated manner. The controller 951 implements various functions for performing printing on the nail in cooperation with a program stored in the storage 952.

Next, the operation of nail printing device 1 when executing printing on the nail will be described.

Figure 7:
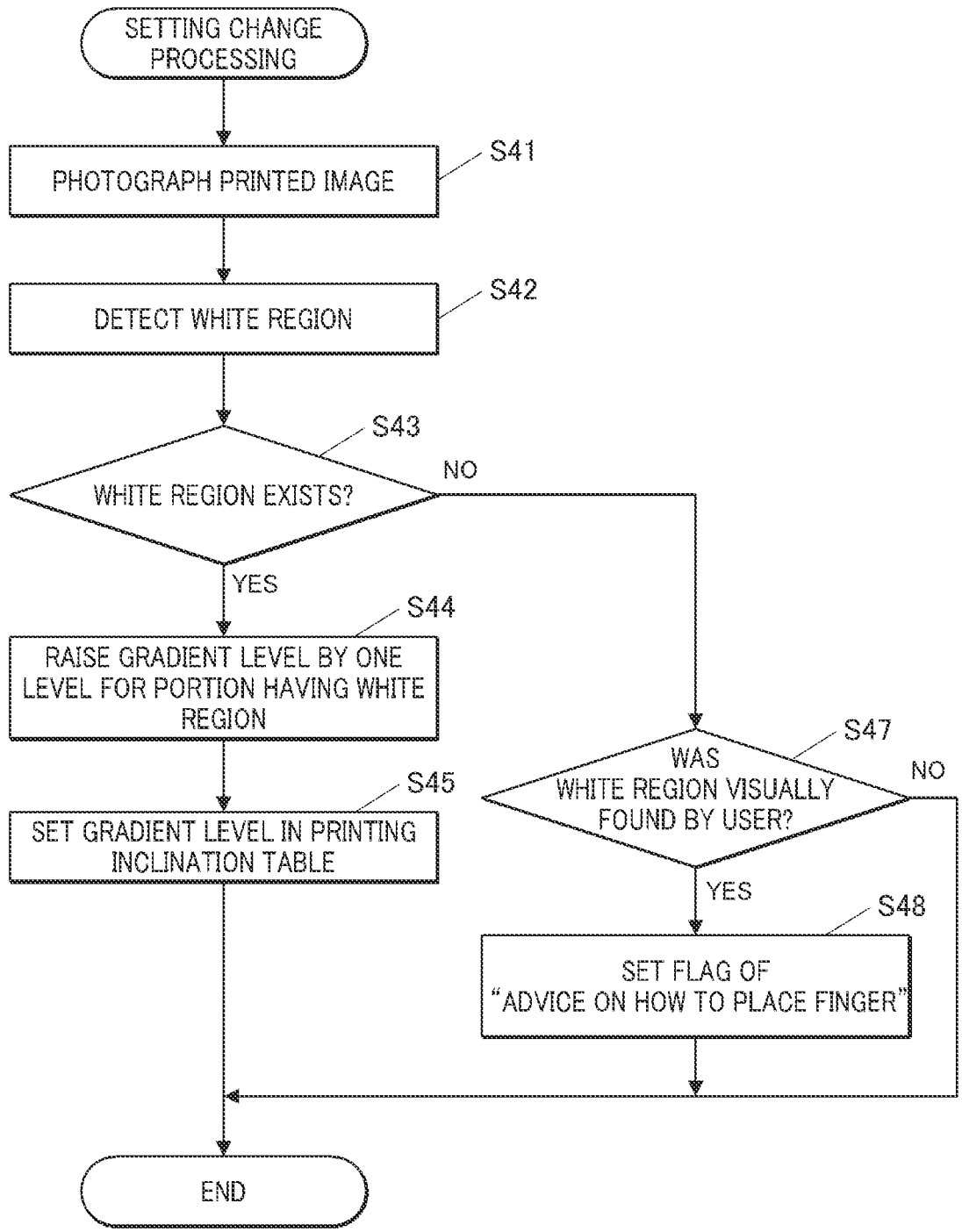
FIG. 7 is a flowchart showing the flow of printing processing of the nail printing device in the embodiment.

Each of FIGS. 6 and 7 is a flowchart showing the flow of printing processing of the nail printing device 1 in the present embodiment. FIGS. 8A to 8D are views showing an example of applying the ground paint and printed image examples on the nail.

The following description is made by assuming that a series of preparations before starting the printing such as selection of nail design and transmission of printing data, and insertion of the printing finger into the finger fixing unit 6 are completed.

A white ground paint is applied to the nail to be printed in advance. The ground paint may be manually applied by the user, or may be applied by the nail printing device 1. In the present embodiment, the application region G of the ground paint is the desired printing range (see FIG. 8A).

When the nail design is selected and the printing data is transmitted, the controller 81 recognizes the user ID (user identifying information) of the user who performs printing on the basis of user input at the operation unit 91. These pieces of data are stored so as to be associated with the user ID.

As shown in FIG. 6, when printing processing is executed, the controller 81 first reads out and obtains the gradient level (left and right height levels and inclination level) of the nail to be printed from the printing inclination setting table 823 of the storage 82 (step S1). The user inputs in advance which fingernail or thumbnail is to be printed.

The controller 81 searches for the printing inclination setting table 823 corresponding to the user ID inside the storage 82. When there is the printing inclination setting table 823 corresponding to the user ID, the controller 81 reads out the printing inclination setting table 823. When there is no printing inclination setting table 823 corresponding to the user ID, the controller 81 reads out the default printing inclination setting table 823.

Next, the controller 81 makes the printing data in an optimum shape for the nail shape on the basis of the gradient level obtained in step S1, and then controls the printing unit 40 with the printing controller 813 to execute printing on the nail (step S2).

Specifically, the controller 81 obtains the nail height corresponding to the obtained gradient level, calculates the nail width in the data to be generated from the obtained nail height, and generates the printing data in the printing range corresponding to the nail width to execute the printing. As for the method for obtaining the nail width from the nail height, the method described in JP 2017-121305 A can be preferably used.

The controller 81 determines whether printing of the nail is finished (step S3). If the controller 81 determines that the printing of the nail is not finished (step S3; NO), the controller 81 repeats the step S3 and waits until the printing ends.

On the other hand, in step S3, if the controller 81 determines that the printing of the nail is finished (step S3; YES), the controller 81 executes setting change processing of changing and adjusting the setting of gradient level of the present nail (step S4).

In the setting change processing, as shown in FIG. 7, the controller 81 first photographs the image of printed nail (hereinafter, referred to as printed image) with the photographing controller 811 (step S41). The photographing controller 811 controls the photographing unit 50 to photograph an image of the nail of printing finger exposed from the window 63 of the finger fixing unit 6, and obtains the printed image.

The controller 81 detects a region of a white color (hereinafter, referred to as a white region) in the nail region of the printed image on the basis of the printed image obtained in step S41 (step S42).

The white region indicates the region to which a white ground paint was applied. Accordingly, the existence of white region indicates that there is a portion which is not printed properly in the desired printing range to be printed. To distinguish between the white region and a white color portion on the design, the printed image may be compared with the printing data.

The white region is tinted with a color due to attachment of dispersed ink in some cases. In such a case, on the detection of white region in the photographing unit 50, the controller 81 detects that the density of end portion is thinner than the density of the other region. Since the density of the printed image of the entire region is already known, whether the photographed density of the portion after printing is thin may be determined by comparison with the density change of the other portion.

When the ground paint is printed with the nail printing device 1, the white region easily gets rough and messed at the end portions in the width direction of the nail. This situation is caused since the end portions in the width direction of the nail are in round curved shapes, and thus the ejected ink droplets do not attach or the attached positions easily get shifted or messed when the print head moves in the direction of going down the inclined surface though the ejected ink droplets attach successfully when the print head moves in the direction climbing the inclined surface. In such a situation, the region which was printed with the ground paint rough and messed may be detected as the white region to perform setting change processing.

Similarly, when the nail design is printed with the nail printing device 1, the ejected ink droplets do not attach or the attached positions easily get shifted or messed on the end portions in the width direction of the nail when the print head moves in the direction of going down the inclined surface though the ejected ink droplets attach successfully when the print head moves in the direction climbing the inclined surface. Thus, the nail design is extended and a region with a density thinner than the desired printing density is easily generated. In such a situation, the region which was printed with a density thinner than the desired printing density may be detected as the white region.

The controller 81 determines whether the white region was detected in the printed image in step S42 (step S43). That is, in this step, the controller 81 determines whether proper printing is performed (whether the printing range is proper) so as not to make the actual printing range smaller than the range of application region G of the ground paint. Accordingly, "proper" printing in the present embodiment indicates that the actual printing range is not smaller than the application region G (desired printing range) of the ground paint.

In the present embodiment, as shown in FIG. 8B, whether or not the white region W exists at three positions of right end Ta, left end Tb and nail base Tc in the nail region T in the printed image is determined (in the example of FIG. 8B, the white region W exists from the right end Ta to the root base Tc).

In step S43, if the controller 81 determines that the white region W was detected in the printed image (step S43; YES), that is, if the controller 81 determines that the actual printing range is not proper, the controller 81 raises the gradient level by one level for the corresponding portion having the white region W detected in the printing inclination setting table 823 which was read out in step S1 (step S44).

For example, when the white region W was detected in the right end Ta of the nail region T, the controller 81 increases the numerical value of the right height level for the corresponding finger number by one level. When the white region W was detected in the nail base Tc, the controller 81 increases the numerical value of the inclination level of the corresponding finger number by one level.

When the white region W was detected in the end portion of nail region T, the degree of height on the end portion side is larger than the current setting or the finger is rotated to the end portion side. Thus, by raising the corresponding gradient level, it is possible to adjust the printing range in the direction of reducing the white region W at the next printing.

When a curve level is used instead of the height level in the printing inclination setting table 823, it is sufficient to change the corresponding curve level.

The controller 81 thereafter sets the changed height level and inclination level in the printing inclination setting table 823, and stores in the storage 82 (step S45).

At this time, if the default printing inclination setting table 823 is read out in the above-mentioned step S1, the inclination level is changed and then the table is stored in the storage 82 as a new printing inclination setting table 823 associated with the user ID. If the default printing inclination setting table 823 was read out and the controller 81 determined that the white region W is not detected in step S43, the default printing inclination setting table 823 may be stored in the storage 82 as a new printing inclination setting table 823 associated with the user ID.

The controller 81 ends the setting change processing.

On the other hand, in step S43, if the controller 81 determines that the white region W is not detected in the printed image (step S43; NO), that is, if the controller 81 determines that the actual printing range is proper, the controller 81 causes the user to visually confirm whether the white region W exists or not (step S47). The controller 81 may output a display urging the user to visually confirm the presence/absence of the white region W to the display unit 92, for example.

If the white region W was not found even by user's visual confirmation (step S47; NO), the controller 81 receives user input indicating the absence of white region W, for example, and thereafter ends the setting change processing.

If the user visually found the white region W (step S47; YES), the white region W which cannot be detected from the image exists. In such a situation, for example, it is suspected that the white region W is located outside the photographing range due to the finger being placed in an extremely rotated state.

Thus, when the controller 81 receives user input indicating that the user visually found the white region W, the controller 81 sets a flag of "advice on how to place finger" (step S48). By setting this flag, when the printing starts next time (before fixing the finger), the proper way to place the finger to the finger fixing unit 6 is displayed on the display unit 92. At this time, there may be displayed a message calling attention such as "Isn't finger too much rotated?" and "Tip of nail placed on placement table?".

The controller 81 then ends the setting change processing.

After the setting change processing is finished, as shown in FIG. 6, the controller 81 determines whether to end printing processing or not (step S5). If the controller 81 determines not to end the printing processing since the printing has not completed for all the fingers (step S5; NO), the controller 81 proceeds to step S1 after the user performs the operation of setting the next finger to the finger fixing unit 6.

If the controller 81 determines to end the printing processing by the user inputting the end instruction or the like, for example (step S5; YES), the controller 81 ends the printing processing.

As described above, according to the present embodiment, whether or not printing is performed in an proper printing range is determined on the basis of the printed image which was obtained by photographing the printed nail. If it is determined that the printing is not performed properly, the setting of printing range is changed.

Thus, it is possible to have proper printing setting by using the printing results.

According to the present embodiment, on the basis of the printed image, the difference (white region W) between the desired printing range and the actual printing range is detected. When the difference is detected, it is determined that printing is not properly performed, and the printing range is changed to reduce the difference.

Thus, it is possible to have proper setting of printing range so that the printing range of next printing is close to the desired printing rage. By repeating printing, as shown in FIG. 8C, it is possible to realize preferred printing which does not have the white region W and has the actual printing range matching the desired printing range.

According to the present embodiment, the storage 82 stores the printing inclination setting table 823 which is the shape data of the printing target so as to be associated with the user ID (identifying information of printing target), and the printing inclination setting table 823 for which the identity with the printing target was confirmed on the basis of this user ID is read out to be used.

Thus, as the printing is repeated, the printing inclination setting table 823 matching the nail shape of the user is gradually generated, and it is possible to realize the nail printing that is desired by the user and does not generate the white region W.

A first modification example of the embodiment will be described.

A nail printing device 1A according to the first modification example is different from that of the above embodiment mainly in the printing inclination setting table which is used and the contents of the setting change processing. Hereinafter, these differences will be mainly described. The same reference numerals are provided to the same components as the above embodiment, and the description thereof is omitted.

As shown in FIG. 2, the RAM 822 of the storage 82 stores a printing inclination setting table 823A with determination flags instead of the printing inclination setting table 823 in the above embodiment.

As shown in FIG. 9, the printing inclination setting table 823A includes three determination flags (left determination flag, right determination flag, and inclination determination flag) corresponding to the three gradient levels (left and right height levels and inclination level) in addition to each item of the printing inclination setting table 823 in the above embodiment.

The determination flag is a flag that is set (raised) when the corresponding gradient level is determined. The determination flag is set when the white region was not detected in the present portion. The determination flag in the present modification example has a value of 0 when the determination flag is not set, and has a value of 1 when the determination flag is set, and the initial value of the determination flag is 0.

In the other respects, the printing inclination setting table 823A is configured similarly to the printing inclination setting table 823 in the above embodiment.

The operation of the nail printing device 1A according to the first modification example will be described.

Figure 10:
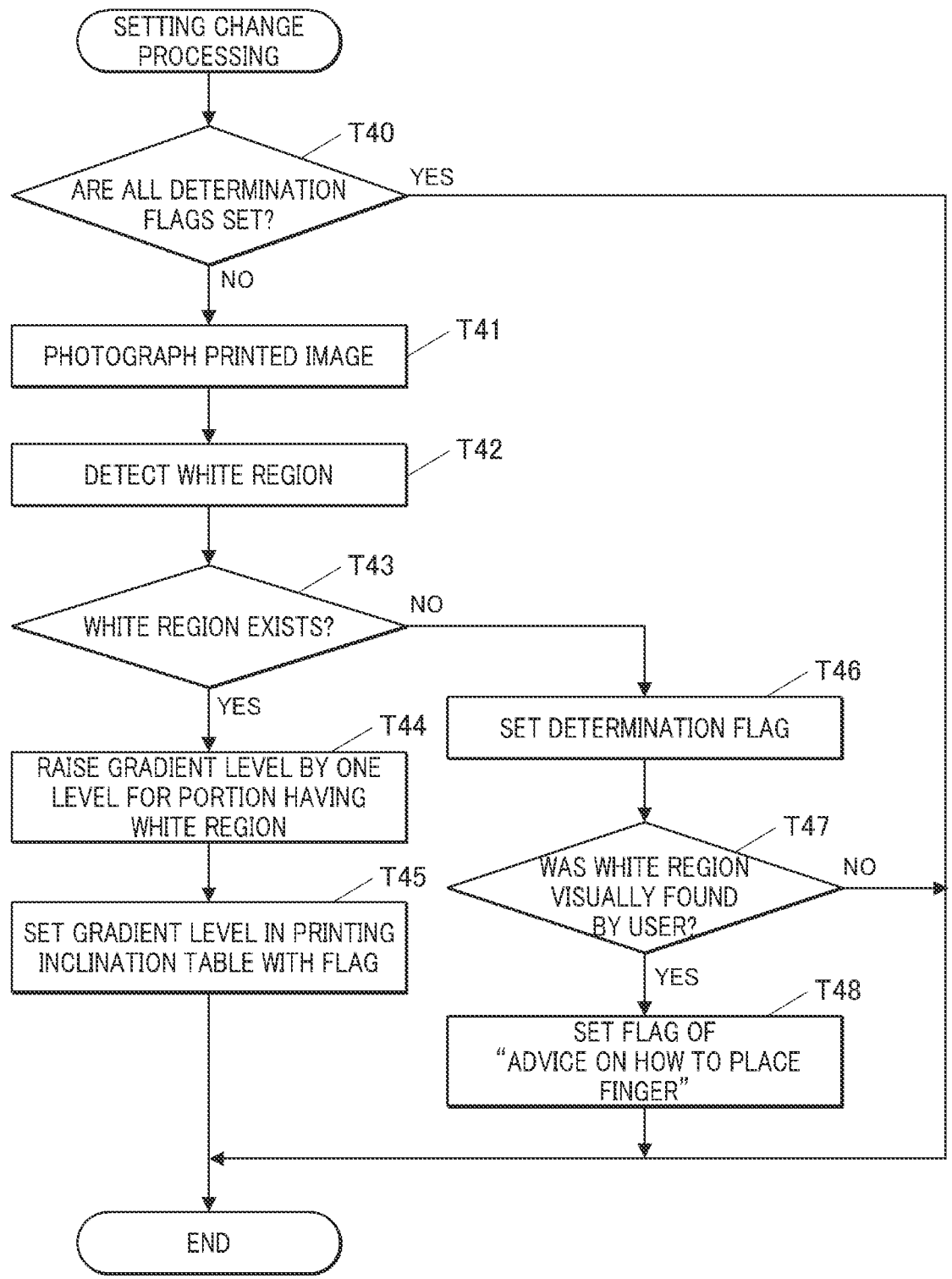
FIG. 10 is a flowchart showing the flow of printing processing of a nail printing device in the first modification example of the embodiment.

FIG. 10 is a flowchart showing the flow of setting change processing in the printing processing of the nail printing device 1A.

The printing processing of the nail printing device 1A is different from the printing processing in the above embodiment mainly in the contents of setting change processing (step S4), and shares common processing contents of the other steps S1 to S3, S5 and S6 (including preparation before start of printing). Thus, explanation of the common parts is omitted.

However, in step S1, the printing inclination setting table 823A with determination flags is read out from the storage 82.

As shown in FIG. 10, when the setting change processing is executed, the controller 81 first determines whether all the determination flags are set (whether the value is 1 or not) (step T40). That is, in this step, it is determined whether or not all the gradient levels are already determined to have the proper printing range.

If it is determined that all the determination flags are set (step T40; YES), the controller 81 determines that all the gradient levels are determined, and ends the setting change processing.

In step T40, if it is determined that there is any determination flag which is not set (step T40; NO), the controller 81 photographs the printed image of the nail (step T41), and detects the white region W in the nail region T on the basis of this printed image (step T42).

These steps T41 and T42 are performed similarly to the steps S41 and S45 in the above embodiment.

Next, the controller 81 determines whether or not the white region W was detected in the printed image in step T42 (step T43).

If it is determined that the white region W was detected (step T43; YES), that is, if it is determined that the actual printing range is not proper, the controller 81 raises the gradient level corresponding to the portion where the white region W was detected by one level in the printing inclination setting table 823A read out in step S1 (step T44), and sets this change in the printing inclination setting table 823A and stores the printing inclination setting table 823A in the storage 82 (step T45). Thereafter, the controller 81 ends the setting change processing.

These steps T43 to T45 are performed similarly to steps S43 to S45 in the above embodiment.

When the white region W was detected in the portion corresponding to the determination flag which is set (for example, when the white region W was detected in the right end Ta of the nail though the right determination flag is 1), the determination flag may be returned to the unset state (value of 0). Alternately, when there is a determination flag which is set, the detection of white region W in the portion corresponding to the determination flag and determination regarding the presence/absence of the white region W (steps T42 and T43) may be omitted.

On the other hand, in step T43, if it is determined that the white region W was not detected in the printed image (step T43; NO), that is, if it is determined that the actual printing range is proper, the controller 81 sets the determination flag corresponding to the gradient level of the portion where the white region W was not detected (step T46). For example, if the white region W was not detected in the left end Tb of the nail region T, the controller 81 sets the left determination flag corresponding to the left height level which corresponds to the left end Tb (sets the value of 1).

When all the determination flags are set in such a way, the setting change processing ends rapidly by the determination in the above step T40 when printing is performed next time. That is, it is possible to omit the processes of steps T41 to T48 in the next printing by determining that the printing range is properly set.

Thereafter, the controller 81 causes the user to visually confirm whether or not the white region W exists (step T47). If the white region W was not found visually (step T47; NO), the controller 81 ends the setting change processing without change. If the white region W was found visually (step T47; YES), the controller 81 sets the flag of "advice on how to place finger" (step T48), and thereafter ends the setting change processing.

These steps T47 and T48 are performed similarly to steps S47 and S48 in the above embodiment.

As described above, according to the first modification example of the embodiment, when it is determined that the printing is performed properly, the determination flag corresponding to the gradient level of the printing inclination setting table 823A is set. When the determination flag is set, the photographing of printed image, determination processing and the like after next printing are omitted.

Thus, the printing range is set properly, and it is possible to simplify the processing after the creation of printing inclination setting table 823A suitable for the nail shape of the individual user.

A second modification example of the above embodiment will be described.

A nail printing device 1B according to the second modification example is different from that of the above embodiment mainly in the printing inclination setting table which is used and the contents of the setting change processing. Hereinafter, these differences will be mainly described. The same reference numerals are provided to the same components as the above embodiment, and the description thereof is omitted.

As shown in FIG. 2, the RAM 822 of the storage 82 stores a printing inclination setting table 823B with a first-time flag instead of the printing inclination setting table 823 in the above embodiment.

As shown in FIG. 11, the printing inclination setting table 823B includes a first-time flag in addition to each item of the printing inclination setting table 823A in the above first modification example.

The first-time flag is a flag that indicates whether printing of the corresponding finger of the user is performed for the first time or not. The flag has the value of 1 for first printing, and has the value of 0 for printings which are performed after the first printing.

In the printing inclination setting table 823B, each determination flag is set by a plurality of levels. The determination flag in the present modification example is set by four levels of 0 to 3. The gradient level is determined in the level 3, and the gradient level is not determined in the levels less than the level 3. The number of levels is not particularly limited as long as the determination flag is set by a plurality of levels.

In the other respects, the printing inclination setting table 823B is configured similarly to the printing inclination setting table 823A in the above first modification example.

The operation of the nail printing device 1B according to the second modification example will be described.

FIG. 12 is a flowchart showing the flow of setting change processing in the printing processing of the nail printing device 1B.

The printing processing of the nail printing device 1B is different from the printing processing in the above embodiment mainly in the contents of setting change processing (step S4), and shares common processing contents of the other steps S1 to S3, S5 and S6 (including preparation before start of printing). Thus, explanation of the common parts is omitted.

However, in step S1, the printing inclination setting table 823B with a first-time flag is read out from the storage 82.

As shown in FIG. 12, when the setting change processing is executed, the controller 81 first determines whether all the determination flags are set to 3 (step U40). That is, in this step, it is determined whether or not all the gradient levels are already determined to have the proper printing range.

If it is determined that all the determination flags are set to 3 (step U40; YES), the controller 81 determines that all the gradient levels are determined. If the first-time flag has the value of 1, the controller 81 sets the value to 0 (step U51), and ends the setting change processing.

In step U40, if it is determined that there is any determination flag which is less than 3 (step U40; NO), the controller 81 photographs the printed image of the nail (step U41), and detects the white region W in the nail region T on the basis of this printed image (step U42).

These steps U41 and U42 are performed similarly to the steps S41 and S42 in the above embodiment.

Next, the controller 81 determines whether or not the white region W was detected in the printed image in step U42 (step U43).

If it is determined that the white region W was detected (step U43; YES), that is, if it is determined that the actual printing range is not proper, the controller 81 subtract 1 from the determination flag corresponding to the portion where the white region W was detected (step U44). The subtraction is not performed if the determination flag is 0.

In the printing inclination setting table 823B which was read out in step S1, the controller 81 raises the gradient level by one level for the portion where the white region W was detected (step U45), and sets this change in the printing inclination setting table 823B and stores the printing inclination setting table 823B in the storage 82 (step U46). Thereafter, if the first-time flag is 1, the controller 81 sets the first-time flag to 0 (step U51), and ends the setting change processing.

These steps U43, U45 and U46 are performed similarly to steps S43 to S45 in the above embodiment.

When there is a determination flag having the value of 3, the detection of white region W in the portion corresponding to the determination flag and determination regarding the presence/absence of the white region W (steps U42 and U43) may be omitted.

On the other hand, in step U43, if it is determined that the white region W was not detected in the printed image (step U43; NO), that is, if it is determined that the actual printing range is proper, the controller 81 determines whether the first-time flag is set to 1 (step U47).

If it is determined that the first-time flag is 1 (step U47; YES), the controller 81 lowers the gradient level by one level for the portion which was determined that the white region W is not detected (step U48). For example, if the white region W was not detected in the left end Tb of the nail region T, the controller 81 lowers the left height level corresponding to the portion by one level. The controller 81 then sets this change in the printing inclination setting table 823B and stores the printing inclination setting table 823B in the storage 82 (step U49). Thereafter, if the first-time flag is 1, the controller 81 sets the first-time flag to 0 (step U51), and ends the setting change processing.

In such a way, when the white region W is not detected and the printing is performed for the first time, the corresponding gradient level is lowered by one level (printing range is reduced).

Thus, even when the actual printing range extends beyond the application region G of the ground paint (see FIG. 8D), it is possible to reduce the printing range to correct the extending of range beyond the application region G only at the first printing.

In step U47, if the controller 81 determines that the first-time flag is not 1 (that the first-time flag is 0) (step U47; NO), the controller 81 adds 1 to the determination flag corresponding to the present portion (step U50). If the determination flag is 3, the addition is not performed. Thereafter, if the first-time flag is 1, the controller 81 sets the first-time flag to 0 (step U51), and ends the setting change processing.

After the processing of step U50, the user may visually confirm the presence/absence of the white region W similarly to steps S47 and S48 in the above embodiment.

In such a way, when the white region W was detected, the subtraction is performed to the determination flag and the gradient level is raised. When the white region W was not detected (except for the first-time printing), the addition is performed to the determination flag to approach to the level determination. Thus, it is possible to adjust the printing range step by step to eliminate the white region W.

In the present modification example, the printing range is narrowed when the printing is performed for the first time and the white region W was not detected. When the white region W is detected as a result of the narrowing, the printing range is adjusted to broaden.

As described above, according to the second modification example of the embodiment, the determination flag divided into a plurality of levels is used. When it is determined that the printing range is proper, the level of determination flag is raised. When it is determined that the printing range is not proper, the level of the determination flag is lowered. When the level of the determination flag is lowered, the printing range is increased.

Thus, it is possible to adjust the printing range step by step until the white region W is eliminated to have the proper printing range.

According to the second modification example of the embodiment, a first-time flag indicating whether the printing of the printing target is performed for the first time or not is used. When it is determined that the printing range is proper and the first-time flag indicates that the printing is performed for the first time, the printing range is decreased.

Thus, even when the actual printing range extends beyond the desired printing range, it is possible to adjust the printing range to correct the extending of range beyond the desired printing range only at the first printing.

The adjustment of the printing range using the first-time flag can also be applied in the first modification example having the determination flag of one level and the above embodiment not using the determination flag.

Though the embodiment (including modification examples) of the present disclosure has been described above, the present disclosure is not limited to the embodiment. Various modifications can be made within the scope of the present disclosure.

For example, in the embodiment, whether the printing range is proper or not is determined on the basis of the printed image, and the printing range is changed if it is determined that the printing range is not proper. However, the determination target based on the printed image and the printing setting to be changed are not limited to the printing range as long as determination is possible on the basis of the image (for example, design, color or the like).

In the present embodiment, as the shape data of the nail which is the printing target, the printing inclination setting table (gradient level) indicating the gradient degree of nail was used. However, the shape data is not particularly limited as long as it is possible to specify the printing range.

The position to determine the presence/absence of white region W is not limited to the three positions of right end Ta, left end Tb, and nail base Tc of the nail region T. However, for any determination position, the gradient level (shape data) corresponding to the determination position is necessary.

In the present embodiment, the nail printing device 1 is configured to perform printing by an inkjet method. However, the method to perform printing by the nail printing device 1 is not limited to the inkjet method.

For example, there may be provided a pen holder that holds a pen for printing which has a pen tip contacting the nail surface to perform printing, and printing may be performed by using the pen. There may be provided both of the printing unit of inkjet method as in the present embodiment and the pen holder that holds the pen for printing, so that printing is performed by using a plurality of printing units.

The present embodiment takes, as an example, a case where the nail printing device 1 forms a printing system in cooperation with the terminal device 9, the input of printing start instruction and the like are performed on the terminal device 9, and the printing operation is executed by the nail printing device 1. However, the nail printing device 1 is not limited to the device shown in the embodiment.

For example, an operation unit and/or a display unit for inputting various instructions, a printing data generation unit that generates data for printing, and/or the like may be provided in the nail printing device 1, and a control device of the nail printing device 1 may perform these processes. By such a configuration, it is possible to configure the nail printing device 1 to be able to complete the printing operation by only the nail printing device 1 without cooperating with the terminal device.

The various types of data such as nail design, image data obtained by photographing, and the printing inclination setting table may be stored in a storage of the terminal device, or may be stored in a storage of the nail printing device 1.

The various types of data may be stored in a server device or the like which can be connected via a network line or the like, so that the terminal device or the nail printing device 1 can access the server device or the like and refer to the data.

Such a configuration enables selecting a design to be printed from among more nail designs.

Although several embodiments of the present disclosure have been described, the scope of the present disclosure is not limited to the above described embodiments and includes the scope of the present disclosure that is described in the claims and the equivalents thereof.

What is claimed is:

1. A printing device comprising:
   a print head;
   a camera that photographs a printing target which is printed by the print head; and
   at least one processor that determines whether or not printing is properly performed to the printing target based on a printed image which is photographed by the camera, and that changes a printing setting by the print head in response to determination that the printing is not properly performed to the printing target;
   wherein the processor determines whether or not an actual printing range by the print head is proper based on the printed image, and changes a printing range by the print head as the printing setting.

2. The printing device according to claim 1, wherein the printing target includes a fingernail, a thumbnail, or a toenail.

3. The printing device according to claim 1, wherein the processor detects a difference between a desired printing range and the actual printing range based on the printed image, determines that the printing is not performed properly in response to detection of the difference, and changes the printing range by the print head such that the difference becomes small.

4. The printing device according to claim 1, further comprising a memory that stores shape data of the printing target in advance, wherein
   the processor determines the printing range by the print head based on the shape data, and changes the shape data in response to determination that the actual printing range is not proper.

5. The printing device according to claim 4, wherein
   the shape data includes a gradient level indicating a gradient degree of the printing target, and
   the processor changes the gradient level in response to the determination that the actual printing range is not proper.

6. The printing device according to claim 5, wherein the processor determines whether or not the actual printing range is smaller than a desired printing range based on the printed image, and changes the gradient level such that the gradient degree of the printing target becomes large in response to determination that the actual printing range is smaller than the desired printing range.

7. The printing device according to claim 5, wherein
   the shape data includes a determination flag corresponding to the gradient level, and
   the determination flag is set in response to determination by the processor that the actual printing range is proper, and photographing of the printed image by the camera and the determination after next printing by the print head are omitted in response to the determination flag being set.

8. The printing device according to claim 7, wherein
   the determination flag is divided into a plurality of levels, and
   the processor raises a level of the determination flag in response to the determination that the actual printing range is proper, lowers the level of the determination flag in response to the determination that the actual printing range is not proper, and increases the printing range in response to lowering of the level of the determination flag.

9. The printing device according to claim 4, wherein
the shape data includes a first-time flag indicating whether or not the printing of the printing target is performed for a first time, and
the processor reduces the printing range in response to determination that the actual printing range is proper and indication by the first-time flag that the printing is performed for the first time.

10. The printing device according to claim 4, wherein
the memory stores the shape data so as to be associated with identifying information of the printing target, and
the shape data for which identity with the printing target is confirmed based on the identifying information is used.

11. A control method of a printing device that includes a print head and a camera which photographs a printing target printed by the print head, the control method comprising:
a determination step that is determining whether or not printing is properly performed to the printing target based on a printed image which is photographed by the camera; and
a printing setting step that is changing a printing setting by the print head in response to determination by the determination step that the printing is not properly performed to the printing target;
wherein the determination step includes determining whether or not an actual printing range by the print head is proper based on the printed image, and the printing setting step includes changing a printing range by the print head as the printing setting.

12. The control method according to claim 11, further comprising:
storing shape data of the printing target in advance;
determining the printing range by the print head based on the shape data; and
changing the shape data in response to a determination that the actual printing range is not proper.

13. A non-transitory computer readable storage medium storing a control program of a printing device that includes a print head and a camera which photographs a printing target printed by the print head, the control program causing a computer to:
determine whether or not printing is properly performed to the printing target based on a printed image which is photographed by the camera including determining whether or not an actual printing range by the print head is proper based on the printed image; and
change a printing setting by the print head in response to determination that the printing is not properly performed to the printing target including changing a printing range by the print head as the printing setting.

14. The non-transitory computer readable storage medium according to claim 13, further comprising:
storing shape data of the printing target in advance;
determining the printing range by the print head based on the shape data; and
changing the shape data in response to a determination that the actual printing range is not proper.

15. A printing control device of a printing device including a print head and a camera that photographs a printing target which is printed by the print head, the printing control device comprising:
at least one processor that determines whether or not printing is properly performed to the printing target based on a printed image which is photographed by the camera, and that changes a printing setting in response to determination that the printing is not properly performed to the printing target, wherein
the processor determines whether or not an actual printing range by the print head is proper based on the printed image, and changes a printing range by the print head as the printing setting.

16. The printing control device according to claim 15, wherein the at least one processor:
stores shape data of the printing target in advance;
determines the printing range by the print head based on the shape data; and
changes the shape data in response to a determination that the actual printing range is not proper.

* * * * *